US009249541B2

(12) United States Patent
Thomas et al.

(10) Patent No.: US 9,249,541 B2
(45) Date of Patent: Feb. 2, 2016

(54) METHOD OF MAKING A ROOF-COVERING ELEMENT OUT OF COMPRESSION MOLDED PLANT FIBERS IMPREGNATED WITH BITUMEN, AND ROOF-COVERING ELEMENT, IN PARTICULAR A RIDGE ELEMENT, A FILLET, A CURB, OR A HIP (75) Inventors: Michel Thomas, Rouen (FR); Melih Kamil, Istanbul (TR); Francois Ruffenach, Rouen (FR); Martin Foutel, Menneval (FR)

(73) Assignee: ONDULINE, Levallois-Perret (FR)

( * ) Notice: Subject to any disclaimer, the term of this patent is extended or adjusted under 35 U.S.C. 154(b) by 0 days.

(21) Appl. No.: 13/994,327

(22) PCT Filed: Dec. 21, 2011

(86) PCT No.: PCT/FR2011/053135
§ 371 (c)(1),
(2), (4) Date: Jun. 14, 2013

(87) PCT Pub. No.: WO2012/085465
PCT Pub. Date: Jun. 28, 2012

(65) Prior Publication Data
US 2013/0263526 A1    Oct. 10, 2013

(30) Foreign Application Priority Data

Dec. 22, 2010   (FR) .................................... 10 61086

(51) Int. Cl.
| *B05D 3/00* | (2006.01) |
| *D21J 3/00* | (2006.01) |
| *D21J 7/00* | (2006.01) |
| *E04D 3/32* | (2006.01) |
| *E04D 3/40* | (2006.01) |
| *E04D 1/30* | (2006.01) |
| *E04D 3/36* | (2006.01) |

(52) U.S. Cl.
CPC ..... *D21J 3/00* (2013.01); *D21J 7/00* (2013.01); *E04D 1/30* (2013.01); *E04D 3/32* (2013.01); *E04D 3/36* (2013.01); *E04D 3/40* (2013.01)

(58) Field of Classification Search
CPC ................ D21J 3/00; D21J 7/00; E04D 1/30; E04D 3/36; E04D 3/32; E04D 3/40; B05D 3/0218; B05D 7/26; B05D 2203/20
USPC .................................. 427/298, 314, 316, 324
See application file for complete search history.

(56) References Cited

U.S. PATENT DOCUMENTS 1,900,427 A * 3/1933 Clapp .......................... 162/117
2,048,045 A    7/1936 Adams (Continued)

OTHER PUBLICATIONS

International Search Report, dated Mar. 15, 2012, from corresponding PCT application.

(Continued)

*Primary Examiner* — Robert S Walters, Jr.
(74) *Attorney, Agent, or Firm* — Young & Thompson (57) ABSTRACT A method of fabricating a roof-covering element out of molded cellulose impregnated with bitumen for roofing. In a first step, an element, preferably of cellulose, is made by hot compression molding in a mold, in a second step, once the element has a dry matter content of at least 60% when extracted from the mold, the element is covered in a pigmented varnish and dried, and in a third step, once the element has a dry matter content of at least 98%, the element is impregnated with hot bitumen. Specific operating conditions are given. The covering elements include in particular a ridge side portion, a ridge cap, a ridge-covering kit, a fillet or curb, and a hip.

20 Claims, 8 Drawing Sheets (56) References Cited

U.S. PATENT DOCUMENTS 3,457,136 A 7/1969 Zaadnoordijk et al.
6,042,359 A 3/2000 Costi et al.
6,706,151 B1 3/2004 Oosthuizen et al.
2003/0129899 A1* 7/2003 Fields .............................. 442/85

OTHER PUBLICATIONS

Colombia Office Action, dated Jul. 9, 2014, in corresponding Colombian Patent Application No. 13-135215-5.

* cited by examiner

METHOD OF MAKING A ROOF-COVERING ELEMENT OUT OF COMPRESSION MOLDED PLANT FIBERS IMPREGNATED WITH BITUMEN, AND ROOF-COVERING ELEMENT, IN PARTICULAR A RIDGE ELEMENT, A FILLET, A CURB, OR A HIP

The present invention relates to a method of making a roof-covering element out of bitumen-impregnated molded plant fibers for roofing a building. The roof-covering elements in question may be a ridge side portion or a ridge cap, an element for connecting to a plane wall, referred to as a fillet or a curb, an element for making a junction between two roof planes, referred to as a hip, or indeed a roof-covering part. The invention has applications in the field of building and construction.

Roof-covering systems for buildings are already known that make use of roof-covering elements based on bitumen-impregnated cellulose, in particular elements in the form of corrugated sheets. When made conventionally, such elements are obtained by a continuous method in which it is possible to obtain cellulose shapes, but only shapes that can be developed in the geometrical sense. Such shapes are subsequently impregnated with bitumen. Such a method is typically described in U.S. Pat. No. 6,042,359.

Document U.S. Pat. No. 2,048,045 describes a method of fabricating conical fiber elements.

The ridge of a roof is covered with ridge covering in order to improve waterproofing against the trickling water that flows over the roof when it is raining or when snow is melting, while also allowing air to flow.

Such roof-covering elements are subjected to weather constraints that may be severe: sun, wind, rain, snow, frost . . . . They therefore need to present characteristics that are suitable for withstanding them. Furthermore, they must be simple to use, of cost that is acceptable, and they must present an appearance that is attractive, or indeed specifically adapted to their architectural environment.

The object of the present invention is to provide a method of making a roof-covering element out of plant fibers, for a sloping roof, said element being fully impregnated with bitumen.

The method comprises the steps of:
in a first step, making a plant fiber element by hot compression molding in a mold cavity of a mold from an aqueous composition of plant fibers that is compressed and heated in said mold until said element has a dry matter content of at least 60%;
in a second step, after extracting the element from the mold, drying said element to a dry matter content of at least 98% in said element; and
in a third step, fully impregnating said element with a hot bitumen; and
during the first step, prior to pressurizing and heating the mold, implementing a prior stage of concentrating the dry matter of the pulp in the mold by applying suction to the mold cavity for a duration such that the dry fraction of the composition remaining in the mold at the end of the prior concentration stage is at least 20%.

It is thus proposed to use a method of hot compression molding plant fiber compositions, more particularly cellulose compositions, that enables roof-covering elements to be made that are capable of having shapes that can be developed or shapes that cannot be developed. The hot compression molding method that is implemented enables elements to be molded having a high density of cellulose. On extraction from the mold, the resulting element, which is preferably based on cellulose, has lost the major fraction of its water and it may then optionally be covered in a colored varnish having a formulation based on resin and mineral pigments, which varnish is subsequently set while hot during an additional drying operation, with the element then finally being fully impregnated with hot bitumen, typically at about 180° C. to 190° C. In order to apply the pigmented varnish, the element must have a dry matter content of at least 60%, on being extracted from the mold. This dry matter content value ensures that the element extracted from the mold does not deform during subsequent operations of applying varnish and additional drying prior to being impregnated with bitumen. This dry matter contents corresponds to the ratio of the weight of the dry matter over the total weight of the article, expressed as a percentage. Thus, a dry matter content of 60% for an article means that the article contains 40% water. In order to be impregnated with bitumen, the elements must have a dry matter content close to 100% so as to avoid having water present in the element and disturbing the impregnation process.

In various implementations of the invention, the following steps may be used singly or in any technically feasible combination:
  filling the mold with the plant fiber aqueous composition before applying compression pressure to the mold;
  filling the mold with the plant fiber aqueous composition without heating the mold;
  performing the prior concentration stage while filling the mold with the plant fiber aqueous composition;
  continuing to fill the mold with the plant fiber aqueous composition during an initial portion of the prior concentration stage;
  performing the prior stage of concentrating the dry matter of the plant fiber aqueous composition in the mold by sucking out the essentially aqueous portion of the composition;
  performing the prior stage of concentrating the dry matter of the plant fiber aqueous composition in the mold prior to applying compression pressure to the mold;
  performing the prior stage of concentrating the dry matter of the plant fiber aqueous composition in the mold prior to heating the mold;
  continuing at least a portion of the step of concentrating the dry matter of the pulp in the mold during at least a portion of the duration of the compression, preferably at the beginning of compression molding in the mold;
  beginning heating of the mold at the beginning of applying compression pressure to the mold;
  beginning heating of the mold after beginning to apply compression pressure to the mold;
  beginning heating of the mold at the end of applying compression pressure to the mold;
  implementing a stage of applying compression pressure to the mold;
  implementing at least two stages of applying compression pressure to the mold;
  implementing a stage of heating the mold;
  implementing at least two stages of heating the mold;
  implementing the steps of concentrating the dry matter, of applying compression, and of heating in the same mold;
  implementing the steps of concentrating the dry matter, of applying compression, and of heating successively in different molds and countermolds;
  performing at least one thermoforming step under compression pressure in the mold during the molding of the first step;

performing the thermoforming step at a temperature laying in the range 150° C. to 320° C., and preferably of about 270° C.;

performing the thermoforming step at a compression pressure in the mold in the range 0.3 megapascals (MPa) to 0.5 MPa, and preferably of about 0.45 MPa;

performing the first step by applying compression pressure to the mold while extracting the aqueous phase by suction from the mold, and then heating the molds;

performing the first step by applying compression pressure to the mold while extracting the aqueous phase by suction from the mold and heating the mold;

the dry fraction of the composition remaining in the mold at the end of the prior concentration stage of the first step laying in the range 20% to 35%;

at the end of the first step, the element extracted from the mold having relative density laying in the range 0.4 to 0.7;

at the end of the first step, the element extracted from the mold having relative density laying in the range 0.45 to 0.7;

at the end of the first step, the element extracted from the mold having relative density preferably laying in the range 0.5 to 0.65;

at the end of the first step, the element extracted from the mold having thickness laying in the range 2 millimeters (mm) to 5 mm;

at the end of the first step, the element extracted from the mold having thickness of about 2.6 mm±0.4 mm;

at the end of the first step, the element extracted from the mold having dry weight per unit area laying in the range 800 grams per square meter ($g/m^2$) to 1800 $g/m^2$;

at the end of the first step, the element extracted from the mold having dry weight per unit area laying in the range 1000 $g/m^2$ to 1400 $g/m^2$;

preferably, at the end of the first step, the element extracted from the mold having dry weight per unit area of about 1250 $g/m^2$;

on extraction from the mold, the element having dry matter content laying in the range 60% to 100%;

on extraction from the mold, the element having dry matter content laying in the range 60% to 96%;

on extraction from the mold, the element having dry matter content of at least 80%;

on extraction from the mold, the element having dry matter content laying in the range 80% to 96%;

advantageously, on extraction from the mold, the element having dry matter content laying in the range 80% to 90%;

preferably, on extraction from the mold, the element having dry matter content laying in the range 80% to 85%;

on extraction from the mold, the element having dry matter content of about 80%;

on extraction from the mold, the element having dry matter content of about 85%;

the element not being subjected to additional compression molding during the steps following the first step;

during the second step, the element being covered with a pigmented varnish;

during the second step, the element being covered with a pigmented varnish and said varnish being allowed to set while drying said element;

in the second step, drying said element to obtain a dry matter content of practically 100% in said element;

during the second step, hot-drying the element by heating; hot-setting the pigmented varnish;

the pigmented varnish including a thermosetting resin;

obtaining the dry matter content required for impregnating the element with hot bitumen while heating the element to set the pigmented varnish;

subjecting the still-hot cellulose element extracted from the mold directly to the second step of applying the pigmented varnish;

subjecting the cellulose element to the second step of applying the pigmented varnish after allowing said element to cool to a determined temperature;

in the second step of applying the pigmented varnish, the element being at a temperature that is equal to or less than the determined temperature;

the pigmented varnish including at least one mineral pigment;

the mineral pigment preferably being a metal oxide;

the pigmented varnish preferably being applied by spraying;

the varnish being based on a thermosetting resin and at least one mineral pigment;

the element being covered in pigmented varnish on one face only, preferably on the top face that will be visible (in full or in part) on the outside of the roof;

applying the pigmented varnish to only one face of the roof-covering element;

applying the pigmented varnish only to the top face of the roof-covering element;

applying the pigmented varnish to both faces of the roof-covering element;

during the third step, impregnating the element with hot bitumen when the element has a dry matter content of practically 100%;

the resulting roof-covering element having a shape that cannot be developed;

the resulting roof-covering element having a shape that can be developed;

the hot compression molding of the first step taking place in a mold of a shape that cannot be developed;

the hot compression molding of the first step taking place in a mold of a shape that can be developed;

the plant fiber is selected from cellulose fibers, said cellulose fibers possibly deriving from any kind of wood, and other fibers including wheat fibers, flax fibers, hemp fibers, and associations thereof;

the aqueous composition of plant fibers being a composition based on cellulose pulp;

the top face of the roof-covering element presenting a smooth surface appearance;

the top face of the roof-covering element presenting a surface appearance similar to that of standard cellulose fiber reinforced bitumen elements, the surface of the mold beside the top face of the element being configured for this purpose;

the top face of the roof-covering element being substantially smooth;

a bitumen-impregnated roof-covering element being made that possesses relative density laying in the range 0.9 to 1.3 (mercury pycnometer method); and the bitumen-impregnated roof-covering element preferably possessing relative density of about 1 (pycnometer method).

The invention also provides a plant fiber roof-covering element covered in a pigmented varnish and fully impregnated with bitumen, for a sloping roof of a building, such that the bitumen-impregnated element is obtained by the method of the invention, the bitumen-impregnated element presenting thickness laying in the range 2 mm to 5 mm, and in the bitumen-impregnated element possessing relative density laying in the range 0.9 to 1.3.

In various embodiments of the roof-covering element, the following means may be used singly or in any technically feasible combination:
- the roof-covering element presents a thickness of 2.6 mm±0.4 mm;
- the roof-covering element is of a shape that can be developed;
- the roof-covering element is of a shape that cannot be developed;
- the roof-covering element is designed to be nailed or screwed in order to be fastened to the roof;
- the roof-covering element is a roof-covering part;
- the roof-covering element is designed to cover a singular point of a roof;
- the roof-covering element is a ridge side portion, a ridge cap, a fillet or curb, or a hip.

The invention also provides a ridge side portion of a sloping roof, the ridge having two side portions on either side of the ridge and a cap covering it.

The ridge side portion is a roof-covering element and said ridge side portion having a V-shape that cannot be developed includes a first flange on one side, referred to as a ridge flange, and a second flange on a second side, referred to as a slope flange, the ridge flange being designed to extend up along one side of the ridge of the roof and to be covered by the cap covering the ridge, the slope flange being designed to extend down along the roof and to be placed on one or more roof-covering parts placed on the slope of said roof, the slope flange including a corrugation complementary to a corrugation of the roof-covering parts that it covers so as to co-operate with said roof-covering parts to provide leaktightness against water flowing on the slope of the roof, and said ridge side portion is of a shape that is symmetrical relative to the ridge so as to be capable of being used equally well on either side of said ridge.

In variants that may be combined with one another:
- the slope flange includes towards its bottom edge and running parallel thereto two mutually parallel embossing lines that are downwardly concave;
- the ridge flange includes a fold line enabling the top portion of said ridge flange to be folded relative to its bottom portion joining the slope flange.

The invention also provides a ridge cap for a sloping roof, the ridge covering comprising two side portions on either side of the ridge of the roof and said cap covering the ridge, each side portion having a ridge flange and a slope flange.

The cap is a roof-covering element of the invention and said cap has a central rounded portion generally in the form of an elongate gutter with its concave side facing downwards and including laterally, on either side of the central portion, substantially plane side flanges, each including a raised shoulder line extending parallel to the corresponding side edge of the cap, said shoulder line being designed to come into correspondence with an embossing line of a slope flange of the ridge side portion.

In variants that may be combined with one another:
- the cap presents a shape that cannot be developed;
- the cap also includes, laterally towards the bottom, corrugations that are complementary to at least a high portion of corrugations in the slope flanges of the ridge side portions;
- the rounded central portion of the cap includes transverse patterns in relief, each resulting from a raised deformation serving to imitate the assembly joints of a conventional ridge covering;
- the cap also includes at least one fold line extending lengthwise along the element;
- the fold line is along the top of the central portion of the cap;
- the fold lines extend along the joints between the central portion and the two side flanges; and
- the cap does not include a fold line.

The invention also provides other elements for covering singular points of a roof such as a fillet or curb and a hip, the fillet or curb being an element for connection to a plane vertical surface (wall, chimney, . . . ) and the hip being an inclined junction element between two roof planes that are distinct from the ridge proper. The fillet or curb and hip roof-covering elements are similar to the ridge side portions, the hip nevertheless presenting corrugations at an orientation that is inclined relative to that of the ridge flange. Furthermore, the hip needs to be covered by a cap and the fillet or curb is connected to the plane surface by a particular mounting.

More particularly, consideration is given to an element for joining a sloping roof of a building to a vertical surface, which element is referred to as a fillet or a curb, and constitutes a roof-covering element of the invention and has a corrugated portion for nailing or screwing to the roof and a plane portion for fastening to the vertical surface in order to provide leaktightness.

Consideration is also given to a junction element between two roof planes, referred to as a hip, such that it is a roof-covering element of the invention and comprises on one side a slope flange for nailing or screwing to the roof and on the other side a flange that is designed to extend along the junction and to be covered by a cap.

More precisely, consideration is given to an element for joining a sloping roof of a building to a vertical surface, which element is referred to as a fillet or a curb, such that it is a roof-covering element of the invention, of a V-shape that cannot be developed, in that it has a first flange on a first side for coming against the wall and a second flange on a second side for extending down along the roof and for placing on one or more roof-covering parts placed on the slope of said roof, the second flange including a corrugation complementary to a corrugation of roof-covering parts that it covers in order to co-operate with said roof-covering parts to provide leaktightness against water flowing on the slope of the roof. In an embodiment, the first flange includes a fold line enabling the top portion of said first flange to be folded relative to its bottom portion that joins the second flange.

Likewise, consideration is also given to a junction element of a sloping ridge between two roof planes, referred to as a hip, such that it is a roof-covering element of the invention, of a V-shape that cannot be developed, and comprises a first flange on a first side for running along the ridge and a second flange on a second side for extending down along the roof and for placing on one or more roof-covering parts arranged on the slope of said roof, the second flange including a corrugation complementary to a corrugation of the roof-covering part that it covers in order to co-operate with said roof-covering part to provide leaktightness against water flowing on the slope of the roof.

Among the advantages of the roof-covering elements of the invention, mention may be made of their geometrical shapes that need not be capable of being developed and that can be obtained by the compression molding that is used, thus making it possible in particular to make elements that are adapted to the singular points of a roof, which is not possible with the conventional technology of a continuous method, and also making it possible to improve the appearance of the roof. The resulting roof-covering elements comply with the usual standards in the field. For example, the nail-tear test (EN 534) gives a result better than 200 newtons (N). Another advantage of the method of making roof-covering elements is that there is no need to proceed with additional molding after the first step, since the element that is extracted from the mold is sufficiently strong to be capable of being subjected to the subsequent operations without any risk of harmful deformation that might require subsequent molding in order to restore a proper shape to the element.

Without being limited thereto, the present invention is exemplified below in the following description of embodiments and implementations given with reference to.

Each roof-covering element of the invention includes at least one corrugation, said corrugation for a ridge side portion being in the slope flange and being complementary to the corrugation in a roof-covering part it covers, and said corrugation for a ridge cap corresponding at least to its general elongate gutter shape and possibly also to corrugations that are complementary to the corrugations of the ridge side portion.

Although known methods for making roof-covering elements continuously enable simple shapes to be obtained, and in particular corrugations, they do not make it possible, in contrast, to make geometrical shapes that are complex, and in particular that cannot be developed.

However, it is possible to make articles out of molded cellulose that have geometrical shapes that are complex by a method of hot-molding cellulose in a press. A method of hot-molding cellulose is described in U.S. Pat. No. 6,706,151. In this type of press, the cellulose pulp is sucked through the mold, which includes internally both pulp insertion orifices and orifices for sucking out the aqueous portion of the pulp, thereby enabling the cellulose to be concentrated and also enabling the steam that is produced by heating the mold to escape.

Nevertheless, the characteristics of articles that are conventionally made by hot-molding cellulose are not suitable for an application to the roofs of buildings and/or for being subjected to additional operations. In addition, the conditions in which the molding method is operated depend on numerous parameters that may interact with one another and may lead to results that are unfavorable and/or to production costs that are too high. In addition, in order to make a roof-covering element, the element produced by the mold is coated in a varnish and the varnish needs to dry. It is also necessary for the element that is produced by the mold to be fully impregnated with bitumen while hot, which element needs to have certain properties in order to be capable of being subjected to this operation without risk. These various operations interact with one another. It is thus relatively complex to obtain a roof-covering element that has particular characteristics by molding under operating and economic conditions that are satisfactory.

The description below of cellulose roof-covering elements, themselves covered in a pigmented varnish and fully impregnated with bitumen, and that are for making a sloping roof on a building, relates initially to elements for the ridge, comprising the ridge side portions 1 and the corresponding cap 8, and thereafter, to fillets, curbs, and hips.

Figure 1A:
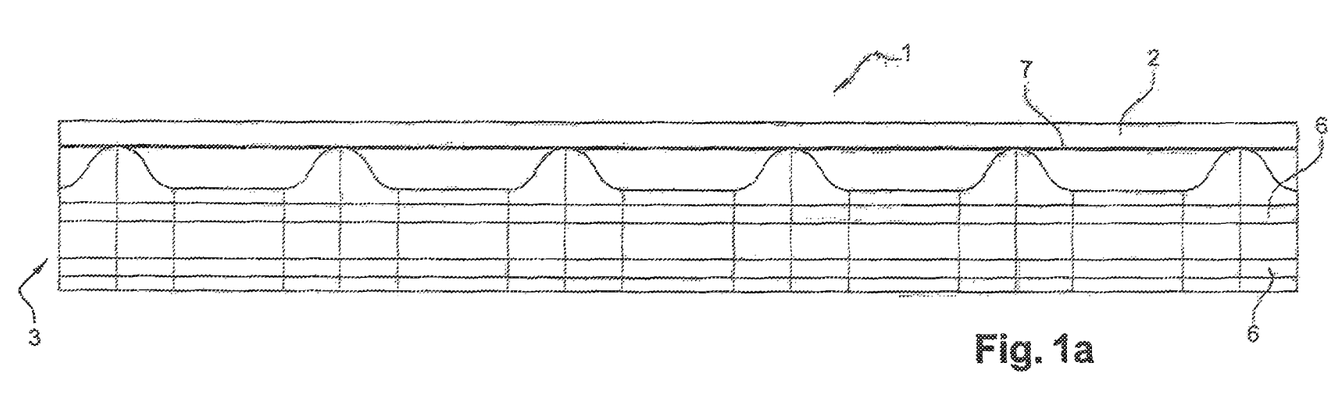
FIGS. 1a, 1b, 1c, and 1d, which show a ridge side portion respectively in plan view, in side/lateral view, in section view on a plane passing through a plane portion of the slope flange, and in section view on a plane passing through the top of a corrugation of the slope flange.
Figure 1B:
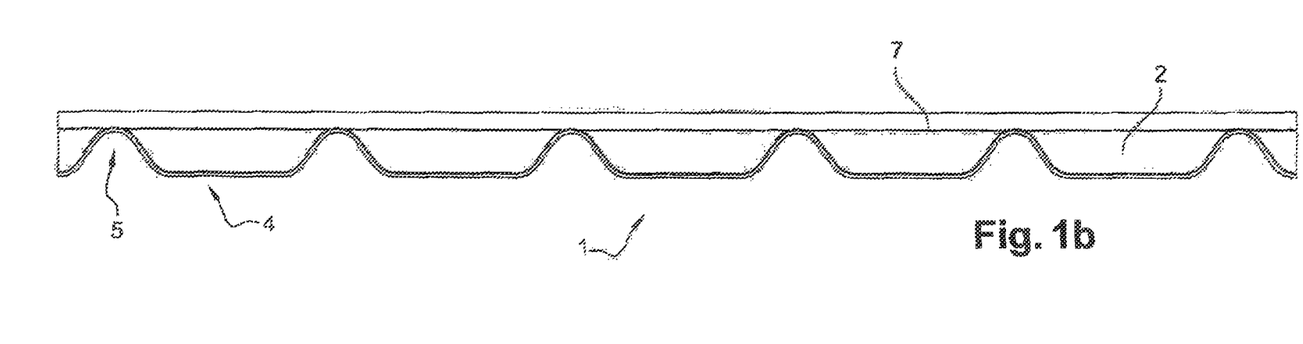
Figure 1C:
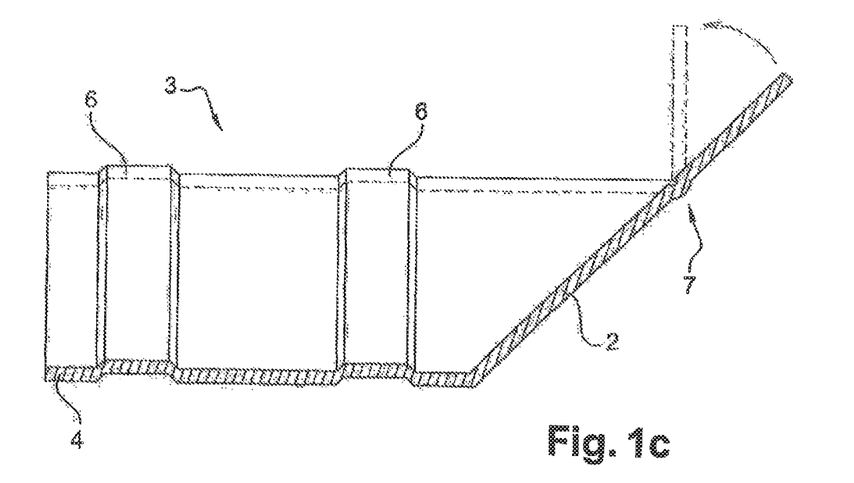
Figure 1D:
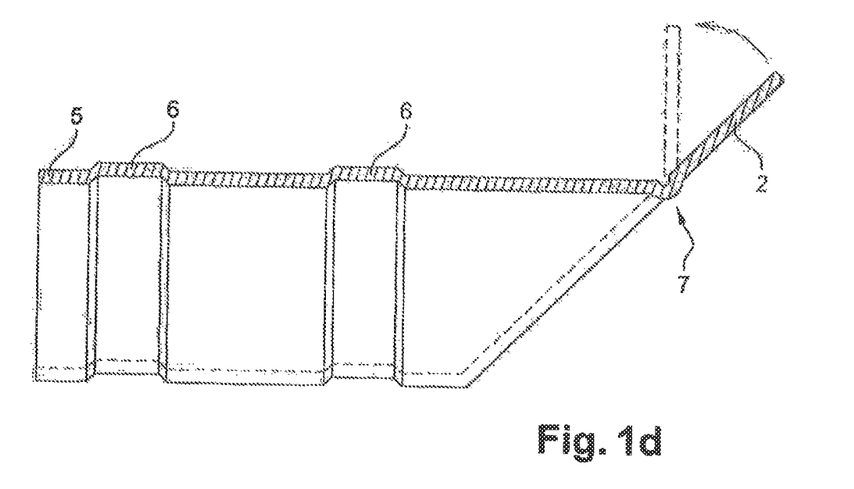
Figure 2A:
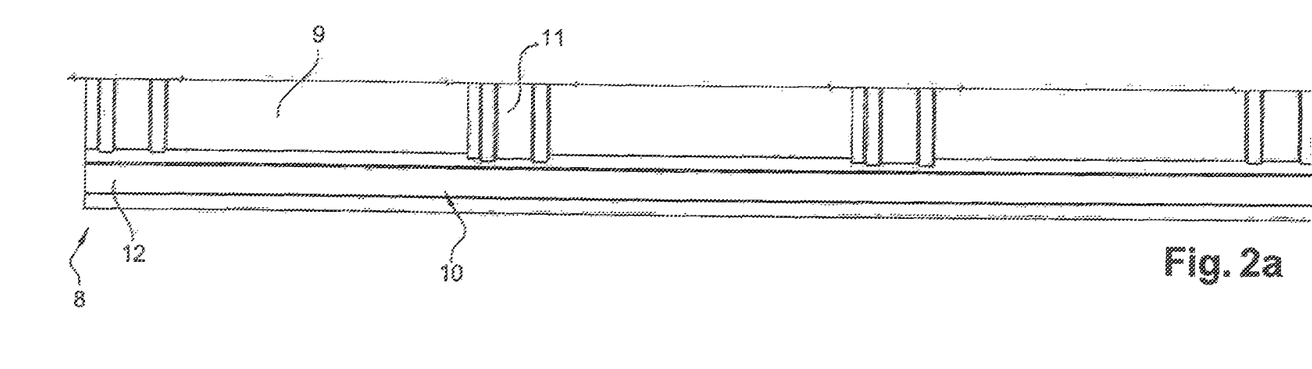
FIGS. 2a, 2b, 2c, and 2d, which show a ridge cap respectively in plan view (only half of the cap is shown), in side/lateral view, in section view on a plane passing through the gutter-shaped portion of the cap, parallel to its top and at little distance therefrom, and in a downward-looking perspective view.
Figures 2B, 2C:
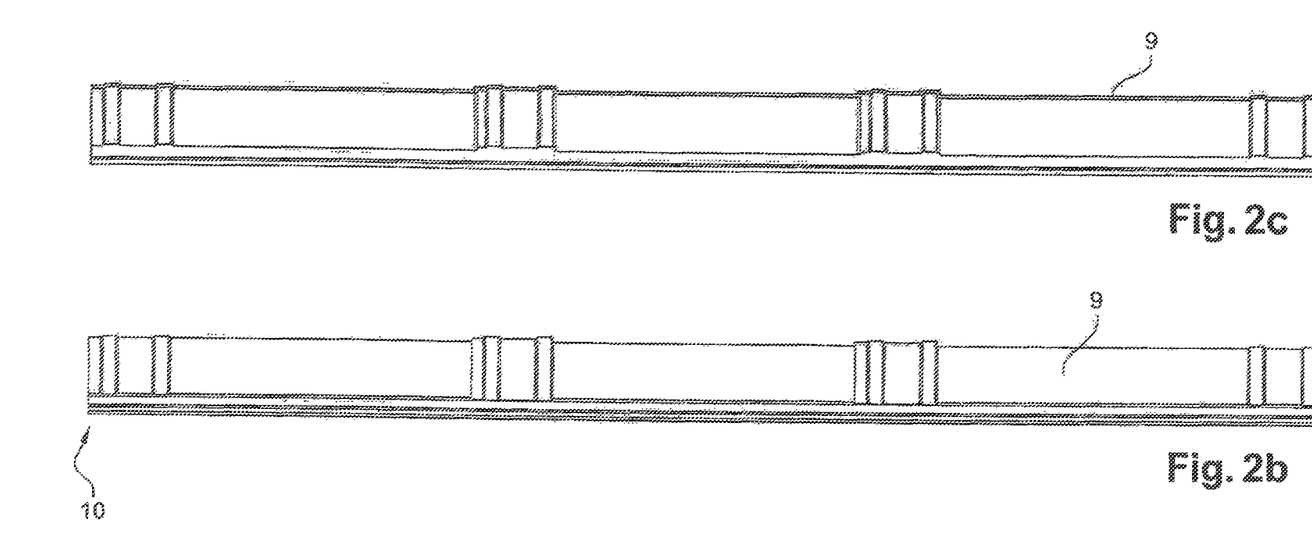
Figure 2D:
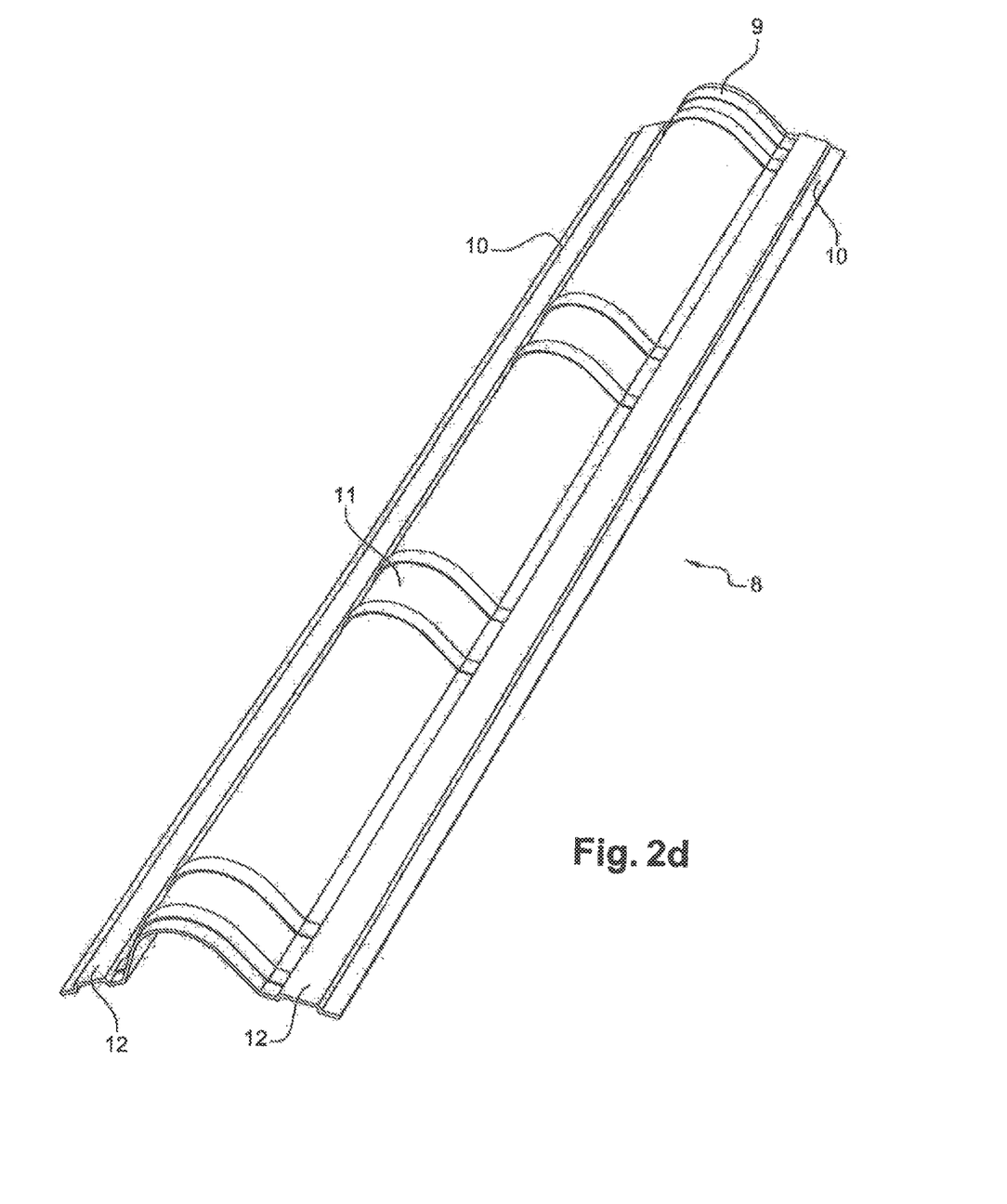

The ridge side portion 1 shown in FIGS. 1a, 1b, 1c, and 1d is a generally V-shaped element with a ridge flange 2 and a slope flange 3. The ridge flange 2 is generally plane and is designed to project up along the side of the ridge beam of the roof. A fold line 7 runs along the ridge flange 2 and provides a certain amount of flexibility for the top portion of the ridge flange, as shown in FIGS. 1c and 1d so as to enable this top portion to be folded. This fold line makes it easier to implement the side portion of the ridge on any type of beam or masonry forming the ridge line. This fold line is optional and may be omitted in various embodiments. It should be observed that in an implementation along a facade or a wall, e.g. in order to build the roof of a porch or a verandah, this ability to fold the top portion of the ridge flange enables it to be pressed and fastened flat against the facade/wall. It is explained below that this possibility of folding also makes it possible to simplify using such a side portion as a fillet or a curb. Although the fold is shown as being upward in order to obtain a ridge flange with a top portion that is vertical, it will readily be understood that the extent to which folding takes place upwards may be pronounced to a greater or lesser extent, or even that the folding could take place downwards, if necessary.

The slope flange 3 is for applying on a roof-covering part, itself placed on the roof timbers, either directly or otherwise (for example a condensation barrier may be present between the roof-covering elements and the timbers). The slope flange 3 has corrugations 5 and these connect with the ridge flange that is plane, which means that the ridge side portion has a shape that cannot be developed. In the example shown, the corrugations 5 of the slope flange 3 of the ridge side portion 1 comprise rounded raised portions that are connected to substantially plane portions 4. The substantially plane portions 4 extend between the raised portions 5 (corrugations) and they are all in a common general plane and they are also connected to the ridge flange 2.

The ridge side portion 1 is an element of a continuous part that serves to ensure the roof is watertight in the zone that it covers. For example, the mean thickness of the ridge side portion is about 2.6 mm±0.4 mm, the base width of the corrugation 5 (raised portion of the slope flange) is about 95 mm (its base thus connecting with the plane portion 4), and the period of the corrugations is about 190 mm, with a plane portion 4 thus having a width between two corrugations of about 190−95=95 mm. The height of each corrugation 5 of the slope flange is about 38 mm. The ridge side portion 1 as shown has a total length of about 1020 mm, a total width of about 140 mm, and a total height of about 62 mm. In one embodiment, there may be six corrugations with the outermost corrugations terminating along two end edges of said ridge side portion. In another embodiment, there may be five corrugations with the two end edges of said ridge side portion then being flat.

The ridge flange 2 is inclined at an angle of about 45° relative to the slope flange 3. In other embodiments, the angle of inclination between the ridge flange and the slope flange may be greater or smaller. Two embossing lines 6, i.e. a pair of embossing lines, that are parallel and with their concave sides facing downwards, are made parallel to the free bottom edge of the slope flange. Each embossing line has a width of about 15 mm, with its own height being about 2 mm, and the lowest embossing line, i.e. the line closest to the bottom free edge of the slope flange, is about 10 mm from said edge.

It can be understood that the values given are approximate, being given by way of indication, and that they may be different depending on the specific models that are fabricated.

As explained above, the ridge side portion 1 thus presents a general V-shape that is open at 45°, with the branches of the V-shape corresponding to the slope flange 3 and to the ridge flange 2. The ridge flange extends up along one of the two sides of the ridge of the roof. The slope flange, beside the slope of the roof, is shaped to fit on and/or press against the shape of the roof-covering parts that are placed on the slope of the roof, the slope flange being applied on and covering the top portions of said roof-covering parts. The slope flange is thus of a shape that is complementary to the shape of the roof-covering parts, and these parts are provided with at least one corrugation. Typically, these roof-covering parts are corrugated sheets of the type having conventional sinusoidal corrugations or trapezoidal corrugations or corrugations of some other type such as for example comprising shapes that are upwardly concave and/or convex to imitate a set of standard roofing articles.

The cap 8 shown in FIGS. 2a, 2b, 2c, and 2d is generally in the form of an upside-down elongate gutter with a rounded bottom 9 that includes laterally, on either side, two side flanges. The rounded and central portion 9 of the cap 8 is thus downwardly concave. The two side flanges 10 are substantially plane, each including a shoulder line 12 that projects upwards and that extends parallel to the corresponding side edge of the cap. The rounded central portion 9 of the cap includes transverse patterns in relief 11 resulting from upward deformation for imitating the assembly joints of conventional ridges. The cap presents a certain amount of transverse flexibility, thus making it possible to open or close said cap to a greater or lesser extent by moving its two side flanges apart or towards each other. If so desired, one or more fold lines of the same type as those in the ridge side portions are made running along the cap 8, e.g. one at the top of the rounded portion 9 and/or one on either side, at the boundary between the rounded central portion 9 and the corresponding side flange 10. Such a fold line is optional and may be omitted in various embodiments.

Figure 3:
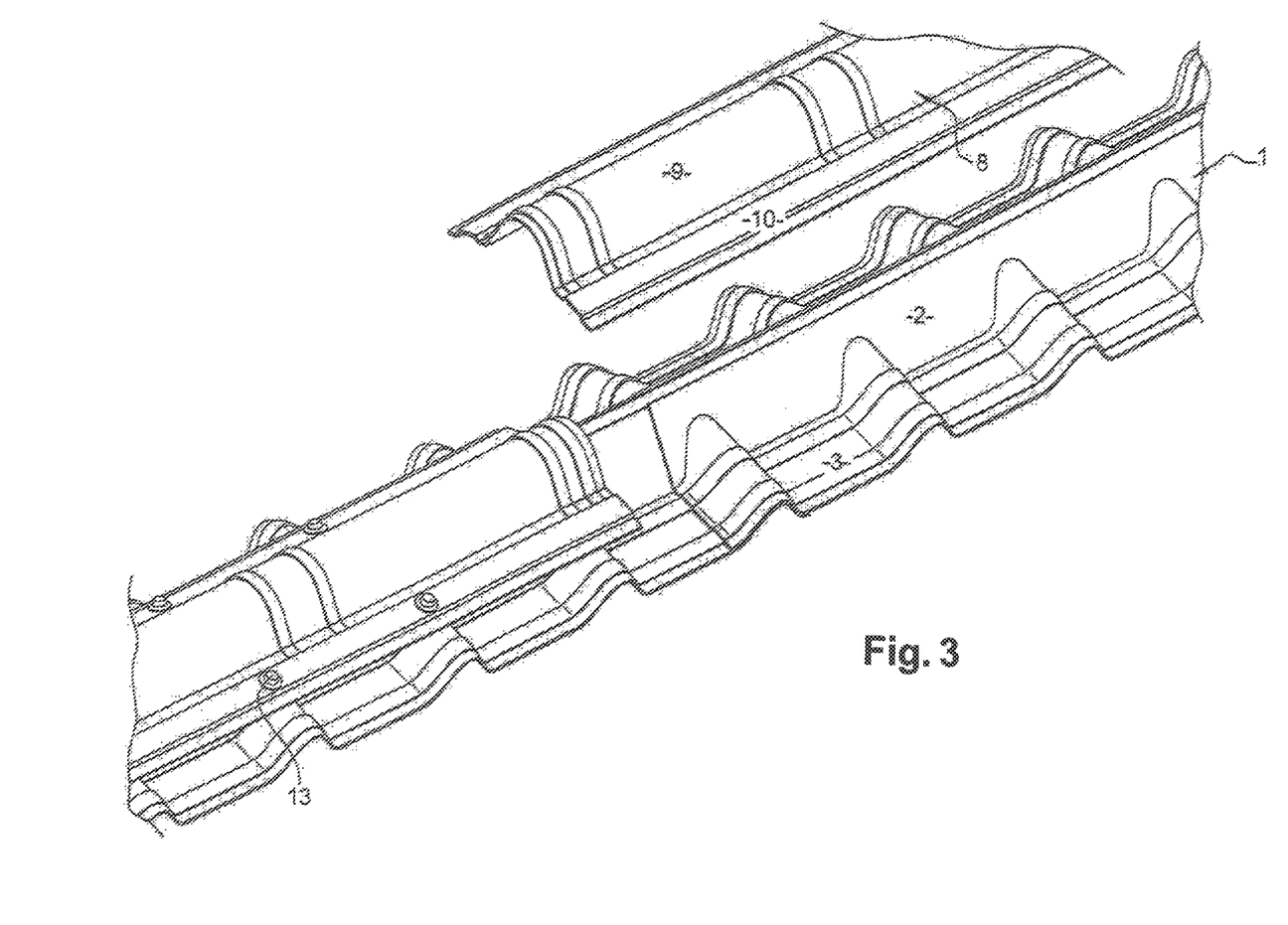
FIG. 3, which is a view showing relationships between the ridge side portions and the ridge cap during assembly.

In FIG. 3, which is simplified since it does not show the roof-covering parts on which the ridge side portions are installed, there can be seen a step of installing a ridge covering, with the left-hand portion of FIG. 3 showing the ridge covering once it has been installed and fastened. In the right-hand portion of FIG. 3, a cap 8 is shown being presented in order to cover the ridge flanges 2 of the corresponding ridge side portions 1. The cap and the ridge flanges are fastened to a beam (not shown) by screws or spikes (nails) 13 arranged where the ridge side portion is in contact with the cap (at the tops of the corrugations). Because of the relative flexibility of the material used in the invention, the cap may be opened to a greater or lesser extent, i.e. with a rounded portion 9 that is rounded to a greater or lesser extent and/or with side flanges 10 that are inclined to a greater or lesser extent, in order to adapt to the width and/or the height of the ridge beam and to the spacing between the ridge side portions. Thus, the roof-covering elements may be fitted to roofs having a variety of slopes, and for example having slopes laying in the range 5 degrees (°) to 90° for standard elements made for the roofs that are usually encountered having a slope laying in the range 6° to 45°. Nevertheless, it can be understood that the invention makes it possible to make a variety of roofing elements that may be adapted to particular constraints.

The shoulder line 12 of the cap preferably engages with one of the two embossing lines 6 of the slope flange of the ridge side portion.

In a variant, the cap also includes, laterally and downwards, side corrugations of shape complementary to the corrugations of the ridge side portions 1 on which the cap 8 is placed so that the cap comes into contact with and fits closely to at least the upper portions of the corrugations 5 of the ridge side portions 1 in these corrugated portions of the cap. These side corrugations on either side of the cap are preferably only partial in terms of height so as to leave gaps between the bottom side edges of the cap and the plane portions 4 of the slope flanges 3 so that the ridge may be ventilated, as can be seen in FIG. 3.

In these FIGS. 2a-2d, and 3, the cap 8 as shown is of a shape that cannot be developed, however in variant embodiments it is possible to use a cap of a shape that can be developed.

Figure 4:
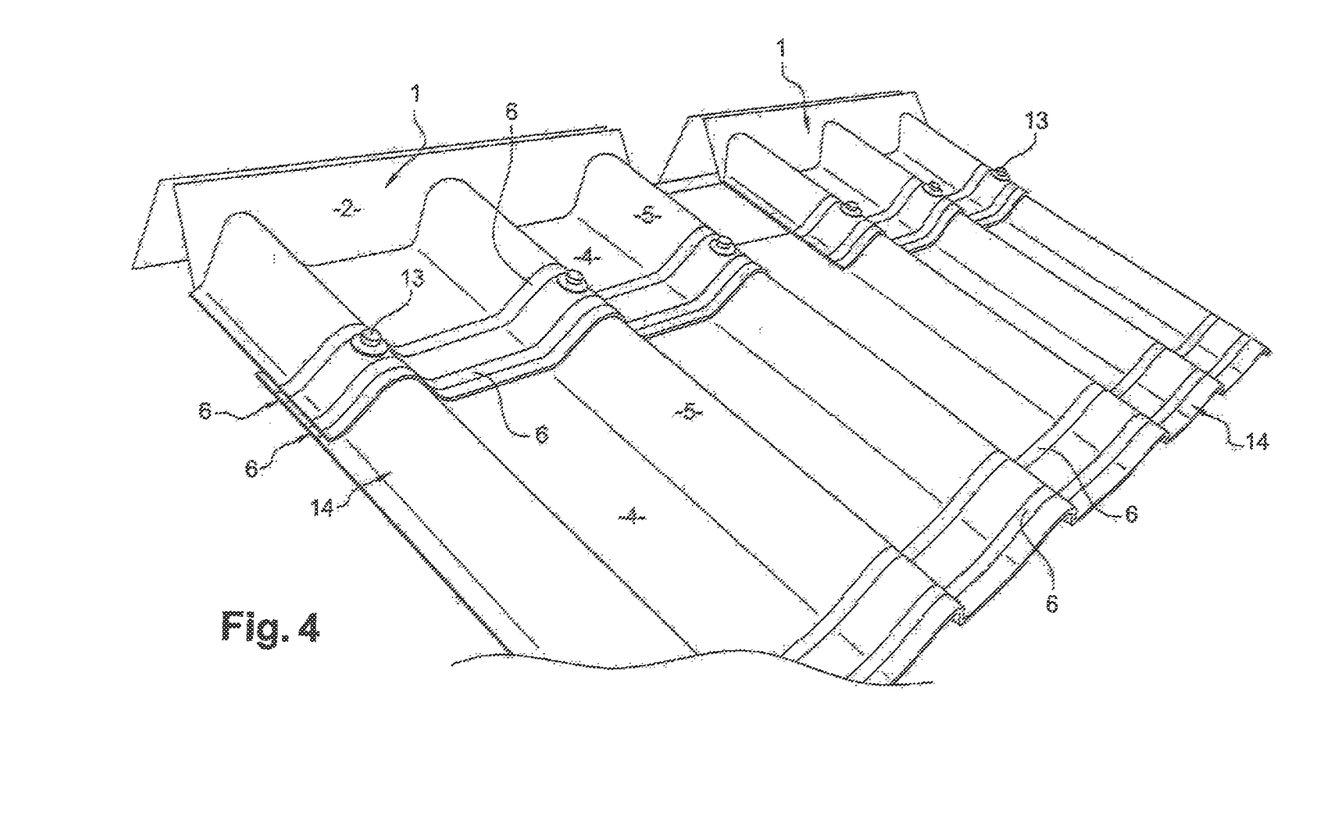
FIG. 4, which is a view of a roof having a ridge with ridge side portions but without a ridge cap, and serving to cover top portions of roof-covering parts.

FIG. 4 shows an experimental assembly made for explanatory purposes serving to show the relationship between ridge side portions 1 and roof-covering parts 14 on one side of a sloping roof. The roof-covering elements used in this example are simplified, in particular the ridge side portions do not have a fold line. Furthermore, a gap has been left along the ridge between the ridge side portions in order to be able to see the top portions of the roof-covering parts 14 that are normally covered by the outside edges of the slope flanges of the ridge side portions. The roof-covering parts 14 are corrugated sheets of a shape that can be developed, preferably they are made of cellulose, and they are fully impregnated with bitumen, preferably having a pigmented varnish applied thereto. The roof-covering parts 14 have the same shape as the slope flange of the ridge side portion, having plane portions 4 between the corrugations 5. In variants, the roof-covering parts may be made of the same material and they may be obtained in the same manner, i.e. by hot-molding in a press, as the ridge side portions of the invention. As a result, the roof-covering parts could then be of a shape that cannot be developed since they are obtained by molding.

The roof-covering parts 14 have pairs of embossing lines 6 along their top and bottom side edges of a shape that is complementary to the pair of embossing lines 6 in the slope flanges of the ridge side portions. These embossing lines 6 of the ridge side portions and of the roof-covering parts engage mutually, as shown in FIG. 4. It can be understood that lower down, going down along the slope of the roof, it is the embossing lines of two successive roof-covering parts that are superposed at their edges that are mutually engaged.

Fastener means 13 of the spike or screw type for fastening the roof-covering elements to the timbers are placed at the tops of the corrugations 5 of the ridge side portions and thus of the roof-covering parts 14 that are covered in this zone by the ridge side portions. It can be understood that in a real embodiment, when the cap is put into place on the ridge side portions, the fastener means pass downwards through the side flange 10 of the cap, through the slope flange of the ridge side portion, and through the roof-covering parts, with all of this taking place at the top of a corrugation.

There follows a description of fillet or curb type roof-covering elements. These elements are similar to the ridge side portions in that they comprise two main portions that are mutually inclined in a V-shape together with patterns, in particular corrugations, that are adapted to cover roof-covering parts arranged under and lower down along the slope of a lean-to roof or of a porch or of a building element that passes through the roof, such as a chimney. Under such circumstances, the fillet is known more particularly as a curb.

A hip is likewise similar to the ridge side portion, but it is intended to be fitted not against the ridge proper but on a sloping ridge of a roof that corresponds to the sloping angle between two portions of a roof having different slopes. Thus, a hip is designed to be arranged along a sloping ridge between two roof planes. A hip is installed with a cap.

Figure 5:
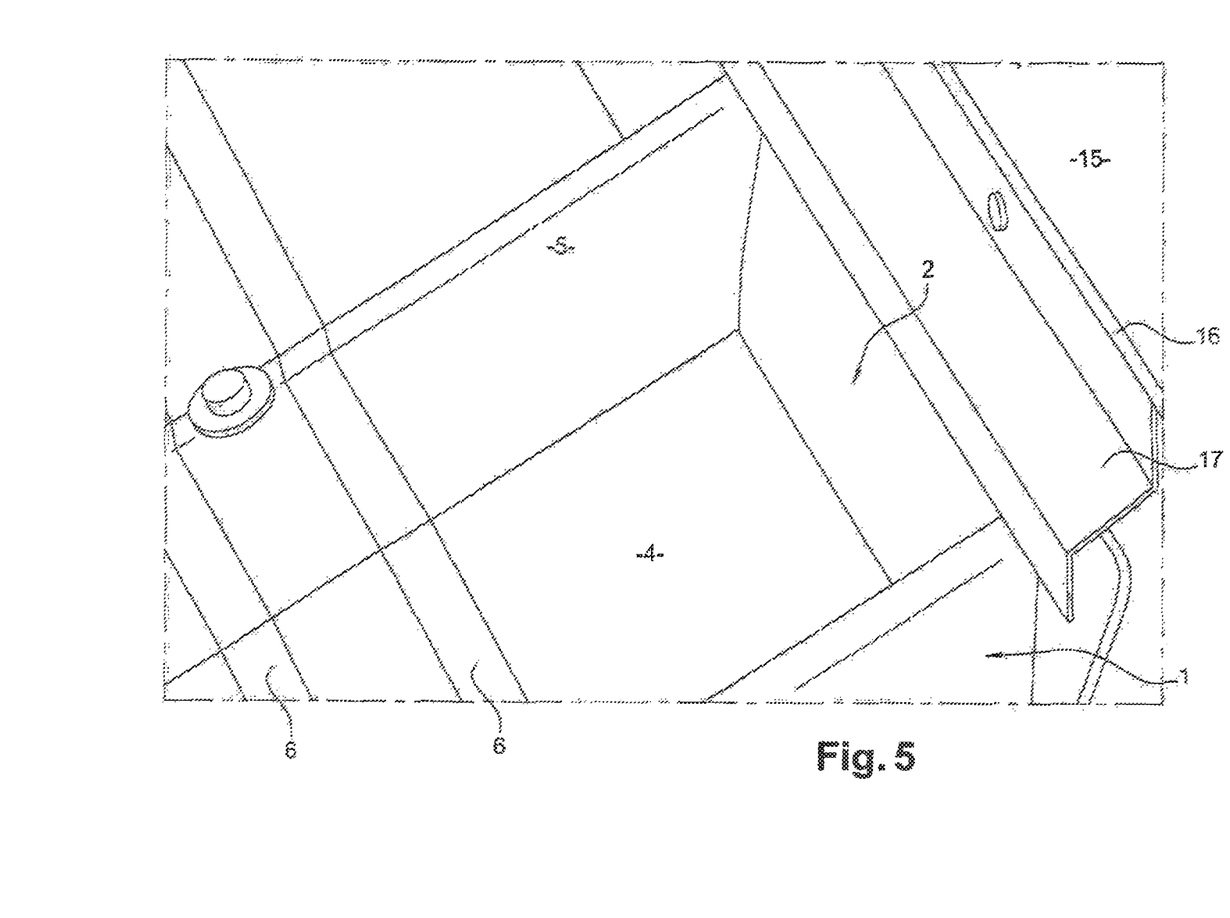
FIG. 5 is a detail view of the interface, referred to as a "fillet", between a wall and a sloping roof, e.g. a lean-to or pent roof.

FIG. 5 shows a variant embodiment of a lean-to type sloping roof or of a porch that joins a vertical wall 15 halfway up via a roof-covering element that constitutes the fillet. The wall in this example is substantially perpendicular to the slope line. For this purpose, roof-covering elements of the same type as the ridge side portion 1 have their ridge flanges 2 fastened flat against the wall 15. The usefulness of the fold line 7 as described above on the ridge flanges 2 of the ridge side portions 1 can be seen: it makes it easy for a ridge side portion 1 that is initially designed for applying to a roof ridge, to act as a fillet: the top portion of the ridge flange 2 is folded relative to the remainder thereof and made vertical so as to be applied against the wall 15. This fold line is optional and could be omitted in variant embodiments. Furthermore, in FIG. 5, the fillet has the same numerical reference 1 as a ridge side portion. The shape and the structure of the remainder of the fillet are similar to those described above for the ridge side portions. In variants, the fillet is a specific element adapted to being used along a vertical wall, e.g. because the ridge flange has two portions, a high portion and a low portion that are angularly offset, or the ridge flange is at an angle relative to the slope flange such that the ridge flange is vertical over its entire height when put into place along a wall in order to cover a porch or a lean-to roof.

In this application as a fillet, and in order to guarantee leaktightness against rain water, edging in the form of a metal section member 17 is put into place and fastened immediately above and along the top edge of the ridge flange, and a sealant joint 16 is made along the section member and the wall. It can be understood that beside the slope flange, the remainder of the covering is provided by using roof-covering parts (not shown in FIG. 5).

It can be understood that the curb may be similar to the fillet under certain circumstances (depending on orientation relative to the slope), but instead of being applied to a wall, it is applied to a vertical element passing through the roof, such as a chimney, for example.

It should be observed that the embossing lines 6, which are to be found on the ridge side portions (including fillets), on the caps (embossing line corresponding specifically to the single shoulder line 12), and on the roof-covering parts, perform at least two functions: firstly they stiffen the roof-covering elements that include them, and secondly they reduce the ability of water to rise by capillarity up the slope between adjacent roof-covering parts or between the ridge side portion and the adjacent roof-covering parts. This second function makes it possible to reduce the width of the overlap zone of the edges between two adjacent roof-covering parts compared with roof-covering parts that do not include such embossing lines, while having the same degree of protection against water rising by capillarity. It is thus possible to cover a larger area of roof with a given number of roof-covering parts. This reasoning can be applied likewise to caps and ridge side portions: the shoulder line 12 of a cap engages one of the embossing lines 6 of a ridge side portion. The same applies to the superposing the embossing lines of side portions and of roof-covering parts. In addition, the embossing lines may also act as markers when putting the roof-covering elements into place on the roof, and for example they may indicate where to place the spikes for nailing (or the screws for screwing) to fasten said roof-covering elements to the roof and/or they may act to place or orient or align said roof-covering elements correctly in parallel lines.

Figure 6:
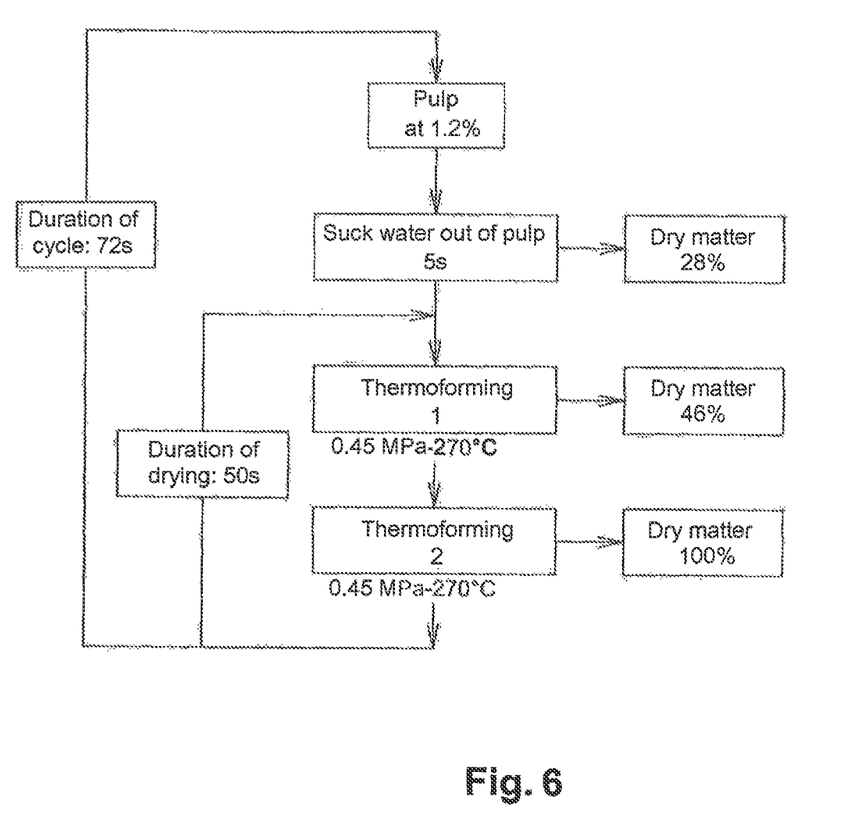
FIG. 6, which is an example of a flow chart for hot compression molding in a press in order to obtain covering elements of a roof.

As an example of how a roof-covering element may be fabricated by hot compression molding, reference is made to the diagram of FIG. 6, which relates more particularly to a first step of hot compression molding an aqueous composition of plant fibers, preferably a cellulose pulp, that makes it possible to obtain a shape that is relatively dry, and that stays in shape, ready to receive a pigmented thermosetting varnish composition and to be dried further in a second step, and then to be fully impregnated with bitumen in a third step.

The total duration of the molding cycle of the first step is about 72 seconds (s) and comprises in order: introducing the cellulose pulp into the mold at a concentration of about 1.2% in the liquid composition, sucking out the liquid portion of the pulp from the mold during 5 s of a prior stage of concentrating the dry matter so as to cause the dry matter in the mold to rise to at least 20%, and in this example to about 28%, and then two stages of thermoforming under a molding pressure of about 0.45 MPa while hot (270° C.) for a total drying duration of about 50 s for the two stages of thermoforming in the mold. During these two successive stages of thermoforming, the dry fraction in the mold goes to 46% and ends up finally at practically 100%. In practice, there is no need to wait for 100% and it is possible to be limited to 60%, or 70%, or preferably 80%, at least of dry matter on extraction from the mold as from such a value the molded element keeps its shape and does not run any risk of deforming significantly during subsequent steps.

Thus, more specifically, operating conditions are implemented such that on leaving the hot compression molding operation, the molded cellulose element as obtained has a dry matter content of at least 60%. Even with some remaining moisture, it is possible to proceed with coating the element with the pigmented varnish composition, preferably using spray application, which composition is subsequently hardened, preferably while hot, during subsequent drying that serves to eliminate practically all of the remaining water prior to full impregnation with hot bitumen. Full impregnation with hot bitumen should preferably be performed on an element that is practically dry, i.e. with a dry matter content that is practically 100%, in order to avoid foaming or other phenomena.

It should be understood that these values are given by way of indication and that they may be different, in particular depending on the elements that are being molded. For example, depending on circumstances, it is possible to use a cellulose pulp at a concentration laying in the range 1.2% to 1.9%, a duration of sucking liquid out from the mold during the prior concentration stage laying in the range 2 s to 15 s, and a total duration of two thermoforming operations laying in the range 15 s to 50 s. The temperature to which the mold is heated may lay in the range 150° C. to 320° C., with a preferred heating temperature for the mold being about 270° C. The compression pressure may lay in the range 0.15 MPa to 0.5 MPa, and preferably in the range 0.3 MPa to 0.5 MPa. At the end of the hot compression molding operation, and depending on operating conditions (on pulp concentration in particular), the molded cellulose element may have a relative density of about 0.53 and a dry weight per unit area laying in the range 1000 g/m² to 1400 g/m², and preferably being about 1250 g/m². The weight per unit area under consideration in this document is that corresponding to an element having a unit non-projected area. To give an idea, for most of the types of element under consideration, the non-projected area or the developed area generally lay in the range 1.1 to 2 times the projected area. The molded cellulose element obtained on leaving the press typically has breaking strength (breaking stress in traction in application of EN 12 311-1) of about 11 MPa and a modulus of elasticity of about 1200 MPa.

It should be observed that in order to obtain a given weight per unit area, it is possible to act on the cellulose concentration of the pulp and/or on the length of time the pulp is introduced into the mold. Sucking out the aqueous portion from the pulp during the prior concentration stage causes the cellulose of the pulp to tend to remain in the mold while the aqueous phase tends rather to be sucked out from the mold, so a process occurs whereby the cellulose in the mold becomes progressively concentrated during suction. It should be observed that the suction ducts of the mold also serve to remove steam during the hot compression of the pulp during thermoforming, thus ensuring that potentially dangerous excess pressure does not form inside the mold, as would happen if the steam could not escape.

Still by way of example, in the coloring, second step, a varnish is used that is formulated on the basis of a resin and a metal oxide presenting a dry quantity of about 70 g/m². The resin is preferably a hot-setting resin. In the third step of fully impregnating with bitumen, a 70/100 grade bitumen is used at 190° C. with treatment having a duration of 10 minutes (min) to 30 min.

Furthermore, the origin of the pulp may be varied depending on requirements. The cellulose pulp may be obtained for example from recycled paper, in particular newspapers, and/or Kraft type paper, and with differing respective proportions when using mixtures. Finally, plant fibers other than cellulose may be used. These other plant fibers may also be combined with cellulose.

Naturally, the present invention is not limited to the particular embodiments described above, but it extends to all variants and equivalents coming within its spirit. Thus, it will readily be understood that the invention may be performed in numerous other ways without thereby going beyond the ambit defined by the description and the claims.

The invention claimed is:

1. A method of making a roof-covering element, for a sloping roof, said roof-covering element being fully impregnated with bitumen, the method comprising:
    a first step of making a plant fiber element by hot compression molding in a mold cavity of a mold from an aqueous composition of plant fibers that is compressed and heated in said mold until said plant fiber element has a dry matter content of at least 60%;
    a second step of after extracting the plant fiber element from the mold, drying said plant fiber element to a dry matter content of at least 98% in said plant fiber element; and
    a third step of fully impregnating said dried plant fiber element with a hot bitumen to produce a bitumen-impregnated element,
    wherein during the first step, prior to pressurizing and heating the mold, implementing a prior stage of concentrating the dry matter of the aqueous composition of plant fibers in the mold by applying suction to the mold cavity for a duration such that a dry fraction of the aqueous composition of plant fibers remaining in the mold at the end of the prior concentration stage is at least 20%.

2. The method according to claim 1, wherein the dry fraction of the aqueous composition of plant fibers remaining in the mold at the end of the prior concentration stage of the first step lies in a range of 20% to 35%.

3. The method according to claim 2, wherein, at the end of the first step, the plant fiber element extracted from the mold has relative density laying in a range of 0.4 to 0.7 and presents a thickness laying in a range of 2 mm to 5 mm.

4. The method according to claim 2, wherein, at the end of the first step, the plant fiber element extracted from the mold presents a dry weight per unit area laying in a range of 800 g/m² to 1800 g/m².

5. The method according to claim 2, wherein during the second step, said plant fiber element is dried to a dry matter content in said plant fiber element of practically 100%.

6. The method according to claim 2, wherein during the second step, the plant fiber element is covered in a pigmented varnish and said varnish is allowed to set while drying said plant fiber element.

7. The method according to claim 1, wherein, at the end of the first step, the plant fiber element extracted from the mold has relative density laying in the range 0.4 to 0.7 and presents a thickness laying in a range of range 2 mm to 5 mm.

8. The method according to claim 1, wherein, at the end of the first step, the plant fiber element extracted from the mold presents a dry weight per unit area laying in a range of 800 g/m² to 1800 g/m².

9. The method according to claim 1, wherein during the second step, said plant fiber element is dried to a dry matter content in said plant fiber element of practically 100%.

10. The method according to claim 1, wherein during the second step, the plant fiber element is covered in a pigmented varnish and said varnish is allowed to set while drying said plant fiber element.

11. The method of claim 10, wherein during the second step, the plant fiber element is covered in a pigmented varnish and said pigmented varnish is allowed to set while drying said plant fiber element such that the bitumen-impregnated element produced in the third step presents a final thickness laying in a range of 2 mm to 5 mm, and a final relative density laying in a range of 0.9 to 1.3.

12. The method according to claim 11, comprising the further step of using the bitumen-impregnated element to cover a singular point of a roof, from the group consisting of a ridge side portion, a ridge cap, a fillet, a curb, and a hip.

13. The method of claim 12, wherein,
    the bitumen-impregnated element is placed on a ridge side portion of a sloping roof with a ridge having two side portions on either side of the ridge and a covering cap,
    said ridge side portion having a V-shape that cannot be developed includes a first flange on one side, referred to as a ridge flange, and a second flange on a second side, referred to as a slope flange, the ridge flange being designed to extend up along one side of the ridge of the roof and to be covered by the cap covering the ridge, the slope flange being designed to extend down along the roof and to be placed on one or more roof-covering parts placed on the slope of said roof, the slope flange including a corrugation complementary to a corrugation of the roof-covering parts that the slope flange covers so as to co-operate with said roof-covering parts to provide leak-tightness against water flowing on the slope of the roof, and said ridge side portion is of a shape that is symmetrical relative to the ridge so as to be capable of being used equally well on either side of said ridge.

14. The method of claim 12, wherein, the bitumen-impregnated element is placed on a ridge cap for a sloping roof with a ridge covering comprising two side portions on either side of the ridge of the roof and said cap covering the ridge, each side portion having a ridge flange and a slope flange, and said cap has a central rounded portion generally in the form of an elongate gutter with a concave side facing downwards and including laterally, on either side of the central portion, substantially plane side flanges, each including a raised shoulder line extending parallel to a corresponding side edge of the cap, said shoulder line being designed to come into correspondence with an embossing line of a slope flange of the ridge side portion.

15. The method of claim 12, wherein the bitumen-impregnated element is placed as a roof-covering element for connecting a sloping roof of a building to a vertical wall, having a V-shape that cannot be developed, with a first flange on a first side for coming against the wall and a second flange on a second side for extending down along the roof and for placing on one or more roof-covering parts placed on the slope of said roof, the second flange including a corrugation complementary to a corrugation of roof-covering parts that the second flange covers in order to co-operate with said roof-covering parts to provide leaktightness against water flowing on the slope of the roof.

16. The method according to claim 1, wherein, at the end of the first step, the plant fiber element extracted from the mold presents a dry weight per unit area of about 1250 g/m$^2$.

17. A method of making a roof-covering element, for a sloping roof, said roof-covering element being fully impregnated with bitumen, the method comprising of sequential steps of:

concentrating a composition of pulp of plant fibers in a mold with a mold cavity by applying suction to the mold cavity for a duration to form an aqueous composition of plant fibers such that a dry fraction of the aqueous composition of plant fibers remaining in the mold at the end of the concentration stage is within a range of 20% to 35%;

making a plant fiber element by hot compression molding in the mold cavity of the mold from the aqueous composition of plant fibers that is compressed and heated in the mold until said plant fiber element has a dry matter content of at least 60%;

extracting the plant fiber element from the mold, the plant fiber element extracted from the mold having a dry weight per unit area laying in a range of 800 g/m$^2$ to 1800 g/m$^2$, a relative density laying in a range of 0.4 to 0.7, and a thickness laying in a range of range 2 mm to 5 mm;

drying said plant fiber element to a dry matter content of at least 98% in said plant fiber element; and fully impregnating said plant fiber element with a hot bitumen to produce a bitumen-impregnated element.

18. The method according to claim 17, wherein said plant fiber element is dried so that the dry matter content in said plant fiber element is practically 100%.

19. The method according to claim 18, wherein during the extracting step, the plant fiber element is covered in a pigmented varnish and said varnish is allowed to set while drying said plant fiber element.

20. The method of claim 19, wherein the impregnating step produces the bitumen-impregnated element with a final thickness laying in a range of 2 mm to 5 mm, and a final relative density laying in a range of 0.9 to 1.3.

* * * * *